Patented Aug. 4, 1953

2,647,912

UNITED STATES PATENT OFFICE 2,647,912

PRODUCTION OF DIMETHYL SILICON DICHLORIDE

Arthur J. Barry and John W. Gilkey, Midland, Mich., assignors to The Dow Chemical Company, Midland, Mich., a corporation of Delaware No Drawing. Application July 19, 1947, Serial No. 762,204

7 Claims. (Cl. 260—448.2)

The present invention relates to methods for the production of dimethyl silicon dichloride.

In the production of methyl silicon chlorides, whether by Grignard or by direct processes of types which have heretofore been described, trimethyl silicon chloride and monomethyl silicon trichloride are formed as by-products. While there is some demand for both of these materials the major demand is for dimethyl silicon dichloride. It is accordingly desirable to convert both trimethyl silicon chloride and methyl silicon trichloride to dimethyl silicon dichloride.

Objects of the present invention are the production of dimethyl silicon dichloride by interacting trimethyl silicon chloride with silicon tetrachloride, monomethyl silicon trichloride, or trichloro silane under conditions which result in the yield of the dimethyl silicon dichloride being much more favorable than would be obtained with a Calingaert distribution.

Another object is the provision of methods for the production of methyl dichlorosilane.

Other objects and advantages of the present invention will be apparent as the description proceeds.

In accordance with the present invention trimethyl silicon chloride is reacted with silicon tetrachloride, monomethyl silicon trichloride or trichlorosilane or with a mixture of the three. The reaction is conducted at a temperature above 300° C. and at a temperature and pressure so correlated that at least a portion of the reactants are present as a condensed phase. The reaction is conducted in the presence of a Friedel-Crafts type catalyst. It has been found that under these conditions the Calingaert distribution does not hold, but that a more favorable distribution toward dimethyl silicon dichloride is obtained than would be expected.

The reactants which are trimethyl silicon chloride and monomethyl silicon trichloride, silicon tetrachloride or trichlorosilane or mixtures thereof may be interacted in any desired relative proportions. Thus, widely divergent ratios of the reactants produce yields of dimethyl silicon dichloride much more favorably than would be expected with the particular ratio of reactants employed. It is preferred, however, to employ the reactants in such proportions that there are present between 0.5 and 3 chlorine atoms per methyl radical. Inasmuch as the desired product is dimethyl silicon dichloride, it is obvious that the most advantageous ratio of materials in the charge is one which contains one chlorine per methyl radical.

The reaction is conducted at a temperature above 300° C. At temperatures below 300° C., the rate of redistribution in accordance herewith is impracticably low. Temperatures substantially higher than 300° C. may be employed if desired. However, it is preferred to operate at temperatures below 500° C., since the increase in rate of reaction at higher temperatures is hardly sufficient to compensate for the use of higher temperatures and pressures. However, the maximum temperature and pressure which may be employed is primarily a function of the equipment used.

The process hereof may be conducted in pressure equipment of any desired type. Thus, a batch autoclave may be employed in which case the pressure is that produced autogenously by the heating of the reactants. Alternatively, the process may be conducted in continuous pressure equipment with continuous feed of reactants and discharge of product.

Friedel-Crafts type catalyst in general may be employed in the process of the present invention. Thus, the principal catalysts of this type are the boron and aluminum halides. Inasmuch as aluminum chloride is the most readily available and most easy to handle of these catalysts, this material is preferred. As is known in the art relating to the use of Friedel-Crafts type catalysts, the reaction may be conducted likewise in the presence of small amounts of hydrogen chloride, water, or diethyl ether. The specific amount of catalyst employed is not critical herein.

Upon initiation of the reaction, larger amounts of the dimethyl silicon dichloride are obtained than of other materials which would be expected in case of random distribution. Accordingly, the advantages of the present invention are obtained even upon initiation of the process when the reaction has proceeded only to a limited extent. Thus, in the case of the reaction of trimethyl silicon chloride and silicon tetrachloride the process hereof initially produces inordinate amounts of dimethyl silicon dichloride as compared with the amounts of monomethyl silicon trichloride which are produced. As the reaction proceeds and the initial reactants are used up, less silicon tetrachloride, monomethyl silicon trichloride, and trimethyl silicon chloride are present in the reaction mixture than would be predicted on a probability basis. Furthermore, it has been impossible to determine the presence of any tetramethyl silane by the analytical methods employed.

The reactant trichlorosilane functions probably as a source of silicon tetrachloride. That which does not react first to produce silicon tetrachloride, probably redistributes directly with the formation of methyl dichloro silane which has been found in the product. An alternative mode of operation would involve the redistribution of the reactants to form dimethyl silicon dichloride and methyl silicon dichloride, followed by decomposition of some of the latter to produce dimethyl silicon dichloride. In the reaction of trimethyl silicon chloride with monomethyl silicon trichloride, dimethyl silicon chloride appears to be the only distribution product which is formed in any amount, except for traces of silicon tetrachloride. Accordingly, the advantages of the present process are obtained upon the initiation of the reaction. Further time of reaction increases the degree of conversion but changes the relative proportions of distribution products formed to a minor extent only. Therefore, it is to be seen that the time of reaction is not critical in the present process. On the basis of practical operation, times in the range of two minutes to 10 hours are preferred.

The process hereof was conducted in each of the following examples in a 2 liter reactor. 6 gram mols of reactants were employed in each instance. Aluminum chloride was present in each instance in the amount of 1 per cent by weight of charged materials. The amounts of materials, expressed as mols are in terms of gram mols.

EXAMPLES

Example 1

A mixture of 4 mols of $(CH_3)_3SiCl$ and 2 mols of $SiCl_4$ were heated for 20 min. at 350° C. in a pressure autoclave. The maximum pressure obtained was 1500 p. s. i. (pounds per square inch). The contents of the autoclave was discharged and distilled. There was obtained 1.86 mols $(CH_3)_2SiCl_2$, 0.18 mol $CH_3SiCl_3$. There was also recovered 1.06 mols of $SiCl_4$ and 2.55 mols of $(CH_3)_3SiCl$ which had not as yet been reacted. It is to be seen that the ratio of $(CH_3)_2SiCl_2$ to $CH_3SiCl_3$ is equal to 10.3 whereas in accordance with a Calingaert distribution the expected ratio of $(CH_3)_2SiCl_2$ to either $(CH_3)_3SiCl$ or $CH_3SiCl_3$ is 1.5.

Example 2

The same reaction mixture was employed as in Example 1. In this instance the autoclave was heated for 8 hours at 350° C. The maximum pressure obtained was 1650 p. s. i. Upon distillation the following materials were recovered:

| | Moles |
|---|---|
| $SiCl_4$ | 0.08 |
| $CH_3SiCl_3$ | 0.63 |
| $(CH_3)_2SiCl_2$ | 4.06 |
| $(CH_3)_3SiCl$ | 0.39 |

In this instance the ratio indicated in Example 1 is 6.45.

Example 3

The reaction mixture employed herein was the same as that indicated in Example 1. The autoclave was heated for 4 hours at 300° C. The maximum pressure obtained was 1175 p. s. i. Upon distillation the following products were obtained.

| | Moles |
|---|---|
| $SiCl_4$ | 1.55 |
| $CH_3SiCl_3$ | trace |
| $(CH_3)_2SiCl_2$ | 0.87 |
| $(CH_3)_3SiCl$ | 3.02 |

Example 4

The reaction mixture employed herein is the same as in Example 1. The autoclave was heated for 4 hours at 325° C. The maximum pressure obtained was 1250 p. s. i. Upon distillation of the product the following materials were obtained:

| | Moles |
|---|---|
| $SiCl_4$ | 1.23 |
| $CH_3SiCl_3$ | nil |
| $(CH_3)_2SiCl_2$ | 1.68 |
| $(CH_3)_3SiCl$ | 2.68 |

Example 5

A mixture of 3 moles of $(CH_3)_3SiCl$ and 3 moles of $CH_3SiCl_3$ was heated for 10 hours at 300° C. The maximum pressure obtained was 1000 p. s. i. Upon distillation the following materials were obtained:

| | Moles |
|---|---|
| $SiCl_4$ | 0.02 |
| $CH_3SiCl_3$ | 1.25 |
| $(CH_3)_2SiCl_2$ | 3.40 |
| $(CH_3)_3SiCl$ | 1.05 |

Based on the 1.05 moles of $(CH_3)_3SiCl$, the maximum amount of $(CH_3)_2SiCl_2$ which should be obtained on the basis of a Calingaert distribution would be 1.575 moles.

Example 6

The reaction mixture employed herein was the same as that in Example 5. The autoclave was heated for 8 hours at 350° C. The maximum pressure obtained was 1450 p. s. i. Upon distillation the following products were obtained.

| | Moles |
|---|---|
| $SiCl_4$ | 0.03 |
| $CH_3SiCl_3$ | 0.66 |
| $(CH_3)_2SiCl_2$ | 4.55 |
| $(CH_3)_3SiCl$ | 0.50 |

Example 7

A mixture of 2 moles of $(CH_3)_3SiCl$ and 4 moles of $SiCl_4$ was heated for 10 hours at 300° C. The maximum pressure obtained was 2900 p. s. i. Upon distillation the following materials were obtained.

| | Moles |
|---|---|
| $SiCl_4$ | 3.19 |
| $CH_3SiCl_3$ | nil |
| $(CH_3)_2SiCl_2$ | 0.98 |
| $(CH_3)_3SiCl$ | 1.13 |

By a Calingaert distribution it would be expected that 2.53 moles of $CH_3SiCl_3$ would be obtained.

Example 8

A mixture of 3 moles of $(CH_3)_3SiCl$ and 3 moles of $SiCl_4$ was heated for 10 hours at 300° C. The maximum pressure attained was 1225 p. s. i. The following materials were obtained by distallation

| | Moles |
|---|---|
| $SiCl_4$ | 2.06 |
| $CH_3SiCl_3$ | 0.21 |
| $(CH_3)_2SiCl_2$ | 1.63 |
| $(CH_3)_3SiCl$ | 1.89 |

In the present instance one would expect to obtain 2.20 moles of $CH_3SiCl_3$ by a Calingaert distribution, whereas the principal product obtained by redistribution was $(CH_3)_2SiCl_2$. The ratio of $(CH_3)_2SiCl_2$ to $CH_3SiCl_3$ was 7.8 to 1, instead of 0.9 to 1, the expected ratio.

Example 9

The reaction mixture employed in this example was a plant fraction which contained 1.92 moles of $(CH_3)_3SiCl$ and 2.30 moles of $SiCl_4$. This commercial cut contained some diethyl ether. This mixture was heated for 1.66 hours at 300° C. The maximum pressure obtained was 1590 p. s. i. Upon distillation the following products were obtained.

|  | Moles |
|---|---|
| $SiCl_4$ | 1.27 |
| $CH_3SiCl_3$ | 0.32 |
| $(CH_3)_2SiCl_2$ | 1.52 |
| $(CH_3)_3SiCl$ | 0.32 |

Example 10

A mixture of 326 grams of $(CH_3)_3SiCl$, 307 grams of $HSiCl_3$ and 6.3 grams of aluminum chloride were charged into the autoclave. The temperature was maintained at 300° C. for 10 hours. The maximum pressure attained was 1050 p. s. i. The contents of the autoclave were then discharged and distilled. The following materials were recovered by distillation in the amounts indicated:

|  | Grams |
|---|---|
| $SiCl_4$ | 3.7 |
| $CH_3SiCl_3$ | 48.7 |
| $(CH_3)_2SiCl_2$ | 381 |
| $(CH_3)_3SiCl$ | 46.7 |
| $CH_3HSiCl_2$ | 43 |

Additionally some low boiling silanes were condensed.

That which is claimed is:

1. The method for the production of dimethyl silicon dichloride which comprises interacting trimethyl silicon chloride and a composition of the group consisting of silicon tetrachloride, monomethyl silicon trichloride and trichloro silane and mixtures thereof at a temperature of at least 300° C., at a correlated temperature and pressure such that at least some condensed phase is present, and in the presence of a Friedel-Crafts type of catalyst.

2. The method for the production of dimethyl silicon dichloride which comprises interacting trimethyl silicon chloride and a composition of the group consisting of silicon tetrachloride, monomethyl silicon trichloride and trichloro silane and mixtures thereof at a temperature of at least 300° C., at a correlated temperature and pressure such that at least some condensed phase is present, and in the presence of aluminum chloride.

3. The method for the production of dimethyl silicon dichloride which comprises interacting trimethyl silicon chloride with silicon tetrachloride at a temperature of at least 300° C., at a correlated temperature and pressure such that at least some condensed phase is present, and in the presence of aluminum chloride.

4. The method for the production of dimethyl silicon dichloride which comprises interacting trimethyl silicon chloride with monomethyl silicon trichloride at a temperature of at least 300° C., at a correlated temperature and pressure such that at least some condensed phase is present, and in the presence of aluminum chloride.

5. The method for the production of dimethyl silicon dichloride and methyl silicon trichloride which comprises interacting trimethyl silicon chloride with trichloro silane at a temperature of at least 300° C., at a correlated temperature and pressure such that at least some condensed phase is present, and in the presence of aluminum chloride.

6. The method for the production of $$(CH_3)_2SiCl_2$$

which comprises reacting $(CH_3)_3SiCl$ with a member of the class consisting of $SiCl_4$ and $(CH_3)SiCl_3$ at a temperature of from 375 to 500° C. and under a pressure of at least about 1,000 pounds per square inch in the presence of $AlCl_3$.

7. The method for the production of $$(CH_3)_4Si_2Cl_2$$

which comprises reacting $(CH_3)_3SiCl$ with a member of the class consisting of $SiCl_4$ and $(CH_3)SiCl_3$ at a temperature of from 300° to 500° C. and under a pressure of at least about 1,000 pounds per square inch in the presence of $AlCl_3$.

ARTHUR J. BARRY.
JOHN W. GILKEY.

References Cited in the file of this patent

UNITED STATES PATENTS

| Number | Name | Date |
|---|---|---|
| 2,403,370 | Hurd | July 2, 1946 |
| 2,406,605 | Hurd | Aug. 27, 1946 |
| 2,421,653 | Sauer | June 3, 1947 |

OTHER REFERENCES

Stokes, Amer. Chem. Jour., vol. 13, (1891) pages 244–253.

Ipat'ev et al., Jour. Gen. Chem. (U. S. S. R.), vol. 1, pages 5–12 (1931).

Calingaert et al., Jour Amer. Chem. Soc., vol. 62, pp. 1107–1110 (1940).

Post, "Chemistry of Aliphatic Ortho-Esters," pp. 133–136 (1943), Reinhold, New York, publisher.

Calingaert, Jour. Am. Chem. Soc., vol. 61, pp. 2755–2756.

Anderson, Jour. Am. Chem. Soc., vol. 66, pages 934–935.